(12) United States Patent
Gimple

(10) Patent No.: US 11,295,382 B2
(45) Date of Patent: Apr. 5, 2022

(54) SYSTEM AND METHOD FOR GLOBAL TRADING EXCHANGE

(71) Applicant: Mark Gimple, New Haven, CT (US)

(72) Inventor: Mark Gimple, New Haven, CT (US)

( * ) Notice: Subject to any disclaimer, the term of this patent is extended or adjusted under 35 U.S.C. 154(b) by 17 days.

(21) Appl. No.: 16/127,646

(22) Filed: Sep. 11, 2018

(65) Prior Publication Data

US 2019/0080408 A1    Mar. 14, 2019

Related U.S. Application Data

(60) Provisional application No. 62/557,366, filed on Sep. 12, 2017.

(51) Int. Cl.
| | |
|---|---|
| *G06Q 20/00* | (2012.01) |
| *G06Q 40/04* | (2012.01) |
| *H04L 67/10* | (2022.01) |
| *G06F 9/455* | (2018.01) |
| *G06F 3/04847* | (2022.01) |

(52) U.S. Cl.
CPC ......... *G06Q 40/04* (2013.01); *G06F 9/45533* (2013.01); *G06F 9/45558* (2013.01); *H04L 67/10* (2013.01); *G06F 3/04847* (2013.01); *G06F 2009/45562* (2013.01); *G06F 2009/45575* (2013.01)

(58) Field of Classification Search
None
See application file for complete search history.

(56) References Cited

U.S. PATENT DOCUMENTS

| | | | |
|---|---|---|---|
| 6,677,858 B1 | 1/2004 | Faris et al. | |
| 6,766,304 B2 | 7/2004 | Kemp, II et al. | |
| 6,772,132 B1 | 8/2004 | Kemp, II et al. | |
| 8,296,217 B1 * | 10/2012 | Howorka | G06Q 40/06 705/37 |
| 2006/0190383 A1 * | 8/2006 | May | G06Q 40/04 705/37 |
| 2007/0198397 A1 * | 8/2007 | McGinley | G06Q 40/04 705/37 |
| 2010/0268632 A1 * | 10/2010 | Rosenthal | G06Q 40/04 705/37 |
| 2011/0178915 A1 * | 7/2011 | Vinokour | G06Q 40/04 705/37 |
| 2012/0089497 A1 | 4/2012 | Taylor et al. | |

(Continued)

*Primary Examiner* — Narayanswamy Subramanian
*Assistant Examiner* — Bhavin D Shah
(74) *Attorney, Agent, or Firm* — DeLio Peterson & Curcio LLC; David R. Pegnataro

(57) ABSTRACT

A system and method for mitigating the effects of transit time latency in the execution of global trade orders at remote exchange servers utilizes a generated complex order. End users with certain trading protocols directed to their asset classes provide the co-located server with their trading parameters, and further personalize their trade orders by establishing rules for executing the orders at each co-located server. This is known as their complex order. A deployed strategy engine generates a virtual machine at each co-located server, which thus allows the co-located server to execute complex orders received from the end user. The end user may modify or delete the complex order at each co-located server at any time. Transit time latency issues are drastically reduced under this system and method.

13 Claims, 5 Drawing Sheets

(56) References Cited

U.S. PATENT DOCUMENTS

| | | | |
|---|---|---|---|
| 2012/0246053 A1* | 9/2012 | McKeon | G06Q 40/04 705/37 |
| 2012/0259762 A1 | 10/2012 | Tarighat et al. | |
| 2014/0143121 A1 | 5/2014 | Stevens | |
| 2014/0180889 A1* | 6/2014 | Rooney | G06Q 40/04 705/37 |
| 2015/0073970 A1 | 3/2015 | Merold et al. | |
| 2015/0235308 A1 | 8/2015 | Mick et al. | |
| 2016/0085810 A1 | 3/2016 | de Castro Alves et al. | |
| 2016/0224370 A1 | 8/2016 | Zheng et al. | |
| 2017/0046783 A1 | 2/2017 | Hosman et al. | |

* cited by examiner

SYSTEM AND METHOD FOR GLOBAL TRADING EXCHANGE

BACKGROUND OF THE INVENTION

1. Field of the Invention

This invention relates to a method and system for mitigating the effects of transit time latency in the execution of global trade orders.

2. Description of Related Art

Over 200 years ago trading was done on a face to face basis. Communication and transactions occurred at the same pace. People could convey ample information about what they wanted from the transaction. As technology advanced with electronic communications, the buyers and sellers could move away from a trading plaza, stockyard, or cornfield and convey the same information about a transaction to a co-located representative who implemented the actual transaction. Communication speeds (10's of milliseconds) were 3 to 4 orders of magnitude faster than the transaction speed.

The reason communications have not increased is due to the physical limitations of networks bounded by the speed of light. Furthermore, the information about the trade has been relegated down to a few parameters such as size, side (buy/sell), entity, order type, and possibly price, and possibly a canned process. This has left the playing field highly tilted for most people transacting orders. As a result, those physically closer to the exchange have had the advantage.

Currently, remote trading procedures exist in the art. These methods of trading allow for direct market access, but are greatly hindered by latency defects caused in transmitting order requests, especially when involving markets located across the globe. In particular, these prior art methods may take seconds to process which—although seemingly quick to the human mind—provides enough time for market fluctuation to drastically change the outcome of such trading methods. These methods further fail to provide the ability to trade remotely with a centralized global control, and with localized execution of children orders.

One specific example of the problems presented by the prior art is the end user trying to "buy at the bid" a stock at an exchange that is located 20 milliseconds away (one way transit), in terms of data transmission times. Using the methods presented in the prior art, the end user would send a limit order to buy at the current bid price as shown on his graphical user interface ("GUI"). Unfortunately, that displayed price is already stale by 20 milliseconds. The order has another 20 milliseconds to go before it reaches the exchange, at best. In fast moving markets, 40 milliseconds (round trip time) can be excessively long. The bid could have fallen by the time the order arrives at the exchange. Thus in some cases, the order gets executed at a higher price. If the bid rises then the order will not execute at all. Thus, there remains a need to enable remote trading on a global exchange, while eliminating the disadvantages caused by latency due to trading remotely, as present in the prior art.

SUMMARY OF THE INVENTION

Bearing in mind the problems and deficiencies of the prior art, it is therefore an object of the present invention to provide a system and method for a global trading exchange that levels the playing field for all players and provides better ubiquitous liquidity.

It is another object of the present invention to provide a system and method for mitigating the effects of transit time latency in the execution of global trade orders at exchange servers using co-located servers.

It is still a further object of the present invention to provide a system and method that allows for personal end user modification of complex orders to be processed by co-located servers.

Still other objects and advantages of the invention will in part be obvious and will in part be apparent from the specification.

The above and other objects, which will be apparent to those skilled in the art, are achieved in the present invention which is directed to a method of mitigating the effects of transit time latency in the execution of global trade orders at remote exchange servers, comprising: providing a graphical user interface for an order management system/execution management system for permitting access by an end user; providing at least one co-located server for receiving remote transmissions from the end user via the order management system/execution management system, the at least one co-located server being in close proximity with an exchange server; determining at least one rule for execution of a trade order; choosing the at least one rule by the end user via the graphical user interface based upon desired trade protocols of the end user for particular asset classes of the end user; creating a complex order comprising basic parameters for the trade order, and the at least one rule for executing the trade order, via the graphical user interface; generating a virtual machine at the at least one co-located server, the virtual machine enabling the at least one co-located server to execute the complex order; transmitting the complex order from the graphical user interface to the virtual machine at the at least one co-located server; executing the complex order at the at least one co-located server using the virtual machine; and mitigating the effects of transit time latency by executing the complex order at the at least one co-located server using the virtual machine, due to the at least one co-located server being in close proximity with the exchange server.

In an embodiment, the method may further include overseeing the execution of a plurality of complex orders by a smart operating system at the at least one co-located server. The step of overseeing the execution of a plurality of complex orders may further comprise load balancing multiple complex orders across multiple end users via the smart operating system within the at least one co-located server.

The method may further include deleting the complex order at the virtual machine prior to or after completion of execution of said complex order.

The complex order may be modified at the virtual machine at any point in time prior to or during the execution of the complex order.

The complex order may be encrypted prior to transmitting the complex order to the at least one co-located server using a private container.

The method may further include: gathering result data created during the execution of the complex order at the at least one co-located server; transmitting the result data from the at least one co-located server back to the end user as the result data is gathered; and displaying the result data to the end user via the graphical user interface.

The end user may determine the at least one rule for execution of the trade order from a third party repository.

The end user may determine the at least one rule for execution of the trade order to be modified by the end user.

In another aspect, the present invention is directed to a system of mitigating the effects of transit time latency in the execution of global trade orders at remote exchange servers, comprising: a graphical user interface for an order management system/execution management system for permitting access by the end user; at least one co-located server for receiving remote transmissions from the end user, for the execution of the complex orders, and for the transmittal of market activity and return data, the at least one co-located server being in close proximity with an exchange server; a rule chosen by an end user based upon desired trade protocols of the end user for a particular asset class of the end user; the complex order comprising the combination of basic parameters for a trade order, and the rule; and a virtual machine generated at the at least one co-located server, the virtual machine enabling the at least one co-located server to execute complex orders; wherein the at least one co-located server is enabled via the virtual machine to processes the complex orders within fractions of a second to eliminate the negative effects of transit time latency.

In an embodiment, the system may further include a smart operating system for overseeing the execution of multiple complex orders within the at least one co-located server. The system may further include load balancing multiple complex orders across multiple end users via the smart operating system within the at least one co-located server.

The end user may delete the complex order prior to or after execution at the at least one co-located server.

The end user may modify the complex order at the at least one co-located server at any time prior to or during execution of the complex order.

In yet another aspect, the present invention may be directed to a method of mitigating the effects of transit time latency in the execution of global trade orders at remote exchange servers, comprising: selecting, by an end user via a graphical user interface for an order management system/execution management system, basic parameters for a trade order; creating, by the end user via the graphical user interface, at least one rule for execution of the trade order to apply with the trade order; combining the created at least one rule with the trade order to create a complex order; transmitting the complex order from the end user to a virtual machine deployed at a co-located server, the co-located server in close proximity with an exchange server for executing the trade order; and executing the complex order at the co-located server using the virtual machine.

In an embodiment, the method may further comprise: overseeing the execution of a plurality of complex orders by a smart operating system at the co-located server. The step of overseeing the execution of a plurality of complex orders may further comprise: load balancing multiple complex orders across multiple end users via the smart operating system within the co-located server.

The complex order may be deleted at the virtual machine prior to or after completion of execution of said complex order.

The complex order may be modified at the virtual machine at any point in time prior to or during execution of the complex order.

The method may further include: gathering result data created during the execution of the complex order at the co-located server; transmitting the result data from the co-located server back to the end user as the result data occurs; and displaying the result data to the end user via the graphical user interface.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE EMBODIMENT(S)

Figure 1:
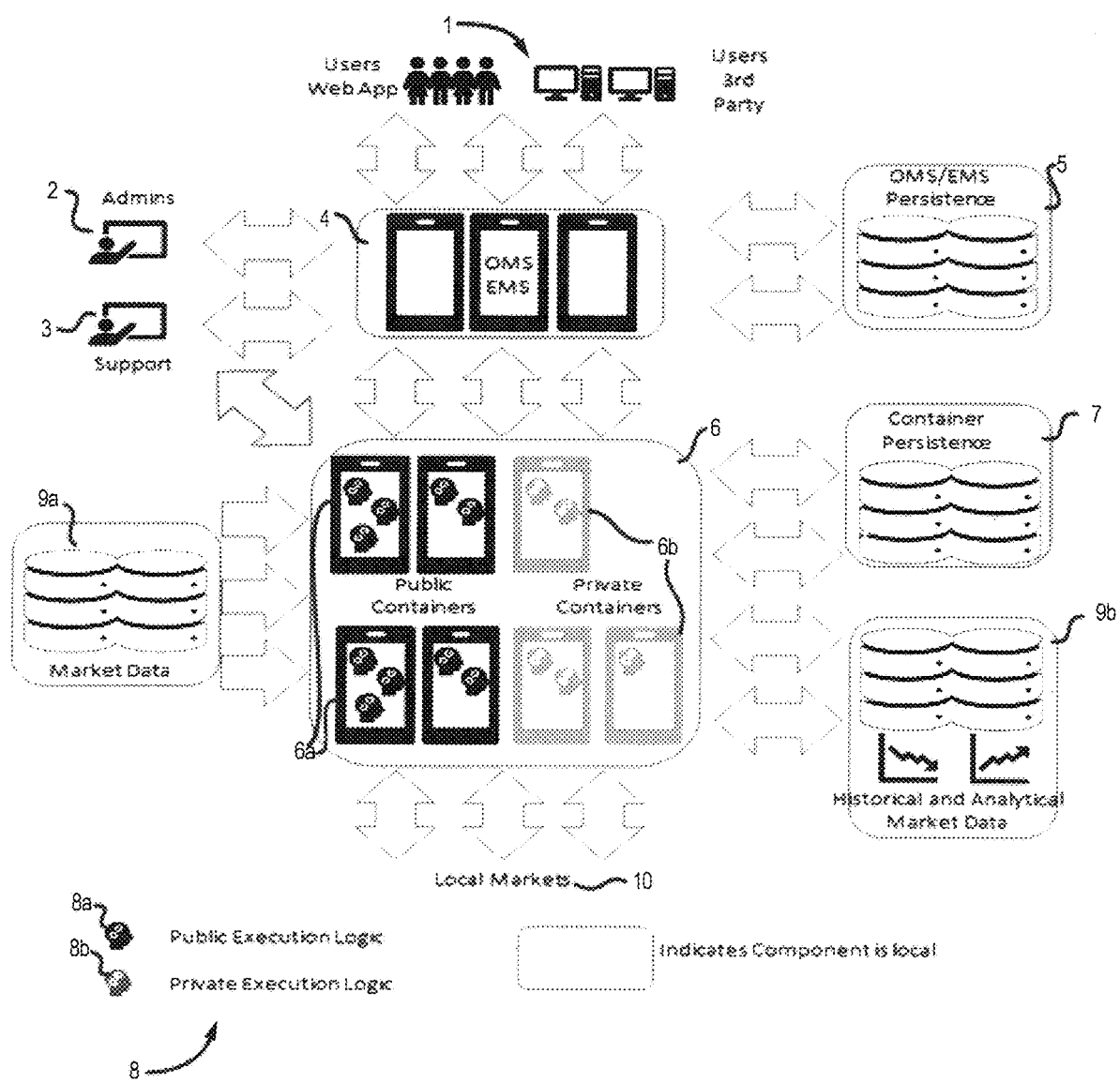
FIG. 1 is a schematic diagram of an exemplary embodiment of the system and method for a global trading exchange, in accordance with the present invention.

In describing the embodiment(s) of the present invention, reference will be made herein to FIGS. 1-5 of the drawings in which like numerals refer to like features of the invention.

For purposes of the subject description, the word "embodiment" or "exemplary" is used to mean serving as an example, instance or illustration. Any aspect or design described herein as an "exemplary embodiment" is not necessarily intended to be construed as preferred or advantageous over other aspects or design. Rather, the use of the word "exemplary embodiment" is merely intended to present concepts in a concrete fashion.

The inventive new process presented here allows an end user to remotely send instructions for executing a trade order for a financial instrument on a global trading exchange in a coded algorithmic form (as a child algorithm/rule, explained in greater detail below) together with basic order essentials (entity, side, size; etc.) to an exchange co-located server. As an example, child algorithms create a limit order at the price of the bid at the exchange. As another example, the algorithm may chase the price upward should the bid rise without execution. It should be understood by those skilled in the art that the child algorithms may encompass any now known or later developed rule for the execution of a trade order, and the present invention is not limited to those described herein. This system may apply to other asset classes as well (e.g. bonds and cash equivalents).

An exemplary embodiment of the present invention is directed to a method and system for mitigating the effects of transit time latency in executing global trade orders at co-located servers not prevalent nor in common use in the field of global trading, which method and system may be applied to any asset class 42 (e.g., stocks, bonds, cash equivalents). In one exemplary embodiment, the invention provides a network of physically co-located servers 48 (to be established near their respective local markets/exchanges 10; see FIGS. 1 and 3) to any end user 1. These co-located servers allow end users 1 to utilize the present invention during their interactions with the exchanges 10 through a graphical user interface ("GUI") 40, the GUI 40 which may consist of, but not be limited to, an end user's personal home computer, laptop, mobile device, etc. The co-located servers 48 are thus established in locations separate to, but in close proximity with, the exchanges 10, or in the alternative, may operate in the exact same location. This exemplary embodiment of a network of the present invention may thus consist of many (up to, but not limited to, about 8-12 to start and then 50-100 over time) small, automated co-located servers distributed across the globe that are capable of processing complex orders 46. As used herein, the term "complex order" is used to describe a logical software object comprising the basic parameters for a trade order in conjunction with a set of rules or a subset of rules for executing the trade order on a global exchange.

An exemplary embodiment of the system of the present invention depicted in FIG. 1 has one or more of the following architecture components:

End Users (Web App) 1: represents any end user 1 accessing the local execution environment via a graphical Web based application (e.g. through their GUI 40).

End Users (Third Party) 1: represents any end user 1 accessing the local execution environment via their own console (e.g. home computer; aka their GUI 40). Integration may be performed via: FIX; REST API; Other protocols.

Admins 2: represents the access of system administrators to the local execution environment for maintenance purposes.

Support 3: represents trade support representatives accessing the local execution environment to support end users.

OMS/EMS 4: represents the OMS/EMS (Order/Execution Management System 4) that is the entry point to all end users 1 whether internal or external. Its purpose is to implement access security, execution logic routing and management. The processes may be deployed in redundant fashion for robustness. IP entry points via VPN or not may also be redundantly deployed.

OMS/EMS Persistence 5: represents the fault tolerant OMS/EMS' database persistence used to manage end users 1, containers 6-7, and execution logic engines and maintain a real-time state of the entire system of the present invention. It is the key data resource used for the monitoring and alerting the system.

Execution Logic Containers 6: represented as "Containers" for short, it is the mechanism by which the complex order logic is deployed and executed. The deployment of the logic may either be done in private or public containers: Public Containers 6a: These containers 6a may be used to deploy validated and tested logic provided by the service and any logic provided by third parties that has been validated and tested so that performance and behavior are quantifiable and known. This allows the sharing of containers and execution engines to minimize cost to the end user 1. Private Containers 6b: These containers may be used to deploy logic that end users 1 demand be completely independent from all other logic for whatever reason. The gamut of how "private" the container is may be logical/virtual or physical with the use of dedicated hardware.

Container Persistence 7: represents the fault tolerant database persistence available to an execution logic 8 during trading or for later reporting.

Execution Logic 8 (Public 8a or Private 8b): this is the knowledge and instructions on how the end user 1 wants to execute a complex order 46. The end user 1 may select from a library 44 of available rules 45 presented by a broker, or the end user 1 may develop, test, and deploy its own, through the GUI 40.

Execution Logic API (not shown): this is the contract between the execution logic 8 and the rest of the environment. It is the specification via which the logic may interact with the available services of the system.

Real Time Market Data 9a: represents the data licensing and messaging infrastructure required to provide real time market data to the execution logic engines. This infrastructure also allows for the injection of derived data into the subscription stream so that it is available to all logic in a private or public fashion. The redundant deployment helps minimize failure to all containers 6-7.

Historical/Analytical Market Data 9b: represents the data and redundant infrastructure to allow query for historical or analytical market data by the execution engines.

Exchanges 10 (the "Local Markets"): represents the fault tolerant connectivity to the local market co-located servers 48 for receiving the transmission of complex orders 46 and receive confirmations, cancels and fills from said co-located servers. Though preference is given to FIX 4.2 or higher (a universal type of Application Programming Interface ("API") geared specifically for interactions between co-located servers 48 and the exchange server 10), the protocol to be used is dependent on what is used locally.

Figure 2:
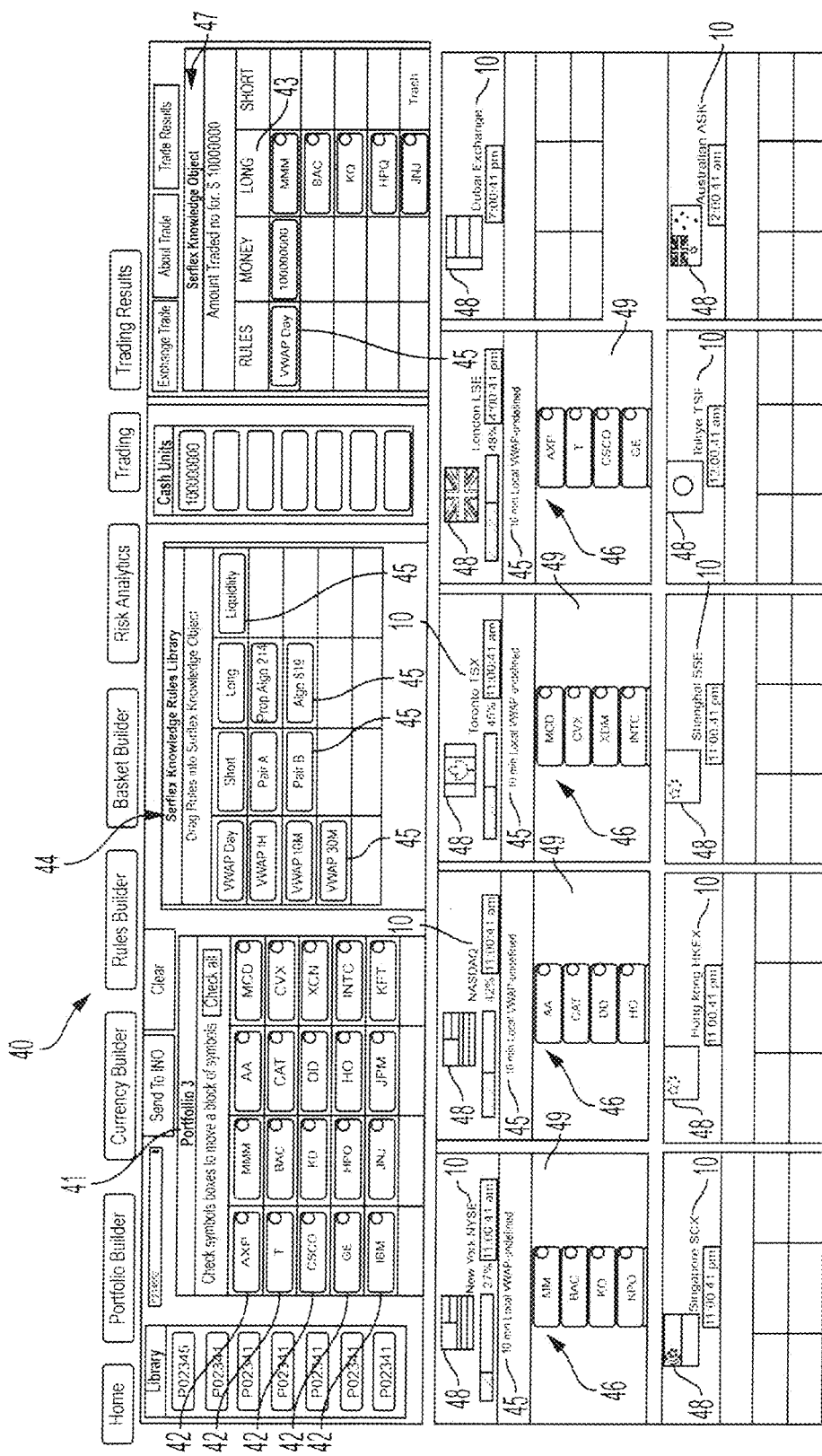
FIG. 2 is an example Graphical User Interface ("GUI") meant for interactivity with an end user, the GUI implementing an exemplary embodiment of the present invention.

FIG. 2 depicts an example GUI 40 implementing the present invention that the end user 1 interacts with (e.g. through their phone, computer, or other electronic device). The end user's 1 personal stock portfolio 41 is displayed on the GUI 40 for selection. The end user 1 selects their desired asset class options 42 from the portfolio 41 to submit as trade orders 43 (e.g. long or short trade orders, etc.). Parent class algorithms 44 (also known as a "rules library," accessible through third party repositories/outside brokers) contain selectable child algorithms 45 (also known as a "rule") to pair with the trade orders 43, with such pairing collectively being called the complex order 46. In an exemplary embodiment, a strategy engine deploys a virtual machine 49 for each individual end user 1(as described in more detail below; see FIG. 3) to these co-located servers 48 to begin the complex order execution process (which may occur in several different ways not limited to what is described herein), with exemplary embodiments of such execution processes shown in FIGS. 4-5.

In an exemplary embodiment where multiple end users 1 respectively send multiple complex orders 46 to a particular co-located server 48, a smart operating system 47 will assist with load balancing these complex orders 46 at the co-located server site 48 to optimize the server's use of its available resources, and thus mitigate transit time latency defects present in the prior art.

The present invention is versatile in that its functions are achievable in either hardware or software forms. In a hardware form, the present invention may be achieved where complex orders 46 are provided to these co-located servers 48 via hardware storage devices such as, but not limited to, CDs, external HDDs/SSDs, flash drives, and so on. Complex orders are executed at the co-located server locations 48 after being uploaded to the servers via the hardware storage devices. An advantage of taking this approach is the utilization of the full processing power available via the hardware of the desired physical co-located server 48.

In consideration of the involved hardware of the present invention described above, the software particulars of the present invention will now be more described below.

Figure 3:
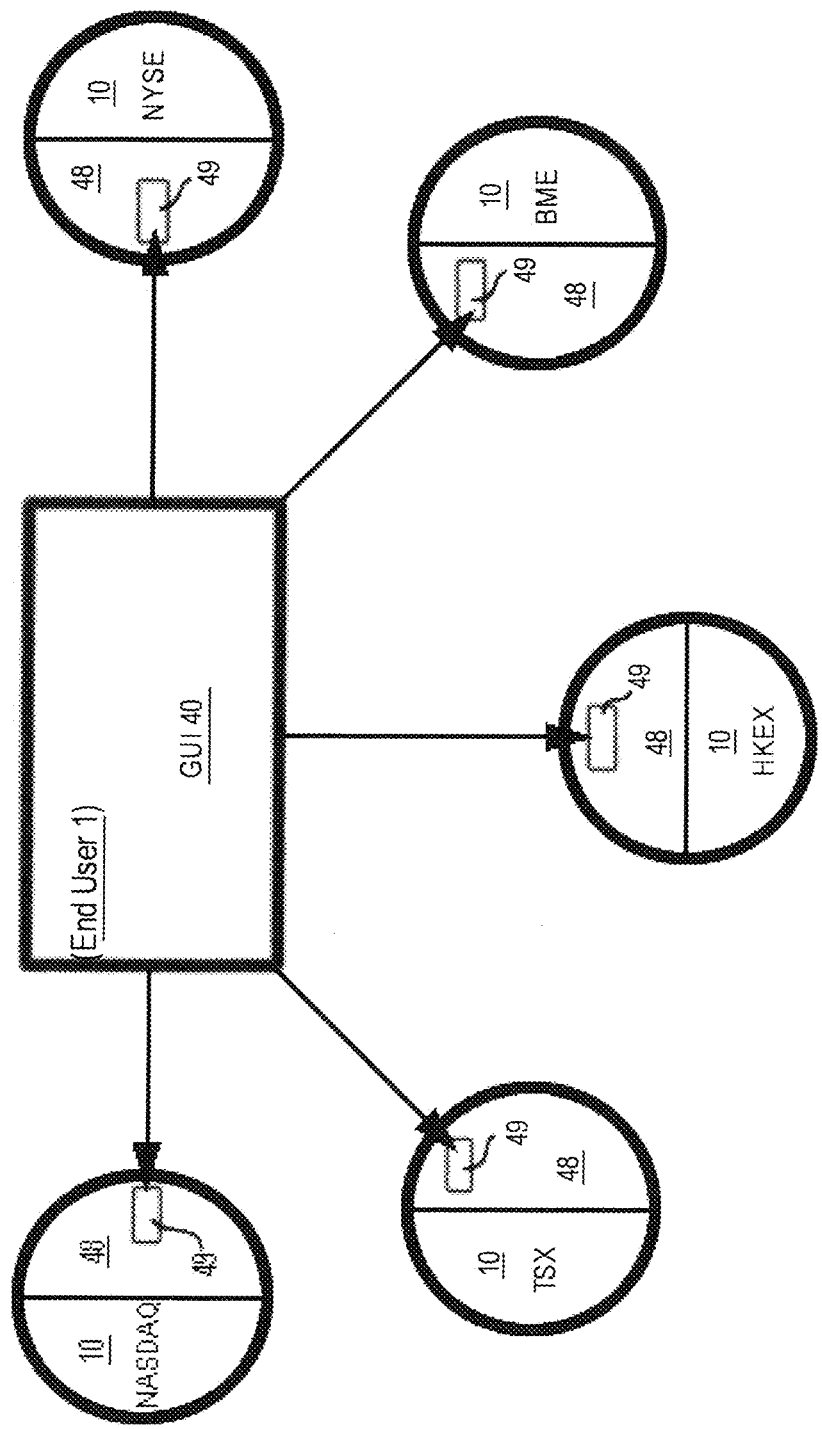
FIG. 3 is a diagram illustrating the connections between the end user(s) and the co-located servers, and further demonstrating the generation of a virtual machine for each end user at each said co-located server.

In a software form, end user(s) 1 may interact with these co-located servers 48 via their dynamic virtual machine 49 (typically through a VPN connection, though other network connection methods may be used), as shown in FIG. 3. Said virtual machines 49 may be established at each co-located server 48 via a trading firm, broker, or other business that engages in related transactions, with a new virtual machine 49 being established for each new end user 1 that begins to employ the present invention. Through their established virtual machines 49 and via the OMS/EMS 4, end users 1 are thus able to access and modify their complex orders 46 on their GUIs 40 via web applications, and interact with the virtual machines 49 using such GUIs 40, as demonstrated in FIGS. 1-3. These virtual machines 49 execute the complex orders 46 transmitted to them from the end user's 1 GUI 40 at the co-located server site 48 so that the co-located server may properly execute the complex orders at their respective exchanges 10 in a manner that mitigates transit time latency. By generating a new virtual machine 49 for each end user 1 at the co-located server sites 48, the effects of transit time latency are mitigated since each machine 49 may focus on processing complex orders 46 for only one end user 1. This system and method as described is not prevalent nor in common use in the relevant field of global trading.

Primary/co-located server centers 48 may be located at current primary exchanges (major liquidity centers) around the world such as, but not limited to, New York, London, Tokyo, Frankfurt, and Hong Kong. The secondary and tertiary/co-located server centers 48 may be located at exchanges such as, but not limited to, Chicago, Toronto, Sao Paulo, Sydney, Singapore, Madrid, etc. See FIG. 2. In this way major sources and consumers of liquidity may be co-located to an existing exchange or to virtual exchanges (i.e. virtual machine servers) located anywhere. One may seamlessly and cost effectively buy and sell assets from any place on the earth with the knowledge that they are playing on a truly level playing field.

In an exemplary embodiment of the present invention, a repository of algorithms may include the parent class algorithms 44 (also known as the "rules library"), and such parent class algorithms comprise inheritable code properties and methods. The parent class algorithms 44 define the entirety of some of the algorithms that are available to end users, which, when broken apart into sections, are called child algorithms 45. In an exemplary embodiment, outside brokers may generate these parent algorithms 44 themselves to later supply to end user(s) 1 for use in their trades, if the end user(s) 1 decide to not modify their own algorithms (such exemplary embodiment further described below). Child algorithms 45 (also known as the "rules") inherit particular designated code properties and methods from these parent algorithms 44, though not necessarily all of the properties and methods found in the parent algorithm. These child algorithms 45 are instead polymorphic in nature, where they further define their own functional behaviors in lieu of what was not inherited from the parent algorithm 44. Exemplary embodiments of these parent algorithms 44 (from which child algorithms 45 may be derived from) briefly include, and are not limited to: volume weighted average price ("VWAP") algorithms (e.g. over one day; VWAP over one hour; VWAP over 30 minutes; VWAP over 10 minutes), Buy at the bid; Short (as a modified algorithm, not to be confused with a short trade order); Long (as a modified algorithm, not to be confused with a long trade order); etc. as exemplified in FIG. 2. The available parent algorithms 44 for use with the present invention are substantially vast compared to what is briefly provided above, which is solely for exemplary purposes.

In another exemplary embodiment, end users 1 with particularly unique trading desires are capable of modifying child algorithms 45 to conform with their personal trading desires (e.g. protocols for engaging certain trading markets in specified server locations) to later be sent to the co-located (e.g. primary/secondary/tertiary) server centers 48 for execution. This modifying capability is essential for fulfilling end user 1 needs based upon their specific trading desires, and also to ensure the proper execution of these child algorithms within the co-located servers 48. Thus, absolute customization may be achieved through the present invention to suit end user(s) 1 needs if the parent algorithms/rules library 44 made available through outside brokers are deemed unsatisfactory.

As mentioned prior, these co-located server networks 48 are capable of processing complex orders 46. Referring to FIG. 2, the complex order 46 is a logical software object that consists of the standard basic parameters for a trade order 43 in conjunction with one or more child algorithms 45. These rules 45 of how to execute the trade order 43 under varying conditions are meant for regulating said complex orders 46 upon deployment to the co-located servers 48. The smart operating system 47 acts as a job processor that manages the resources of their respective server (i.e. exchange) as multiple complex orders are sent in.

The complex order 46 must further adhere to the legal protocol established for the co-located environment, and may need authentication keys in order to have access. For example, the legal regulations for exchanges located in the United States may differ from the legal regulations in Hong Kong. In the case of processing multiple complex orders 46 at a server site 48, the smart operating system 47 may further function to ensure that the complex orders 46 and thresholds designated by their trade orders 43 and child algorithms 45 adhere to these regulations at each co-located server 48, by only allowing complex orders to execute upon verifying that such legal regulations are actually adhered to. If the legal protocol/regulations are not adhered to, then the complex order will not be processed.

Using the above-described present invention, the client/end user 1 may trade globally from one point on the earth, overseeing trading orders 43 and algorithms 44, 45 across multiple exchange venues, all from their own personal GUIs 40. They may trade multiple frequency algorithms. The end user 1 may keep the lower bandwidth (where low-bandwidth transit times occur within hundreds of milliseconds) and more proprietary components of their parent algorithm(s) 44 at their own site (e.g. the GUI 40), while the complex orders 46 generated (via a combination of trade orders 43 and rules/child algorithms 45) may be sent to exchange co-located servers 48 to be executed at a higher bandwidth (where high-bandwidth transaction speeds occur under hundreds of microseconds) via the virtual machine 49. Unlike the problems presented in the prior art, high-bandwidth transaction speeds are approximately, but not limited to be, 3 to 4 orders of magnitude faster than the transit times (whereas the reverse was present in the prior art, with transit times being faster than the transaction speeds). By executing the complex orders 46 at higher bandwidths at the co-located servers 48, the severe latency defects present in the prior art are avoided.

In an exemplary embodiment, these complex orders 46 may be sent well in advance to a designated server 48 to later execute automatically upon the occurrence of a desired market condition (e.g. desired bid price achieved), such process shown as steps 20-26 in FIG. 4. The end user(s) 1 creates the complex order(s) 46 through their GUI 40 to be sent to the co-located server 48 in step 20. The complex order(s) 46 is transmitted to the virtual machine 49 at the co-located server 48 in step 21. As an optional step 22, the end user(s) 1 is capable of modifying, pausing, stopping, canceling, or deleting this complex order 46 from the co-located server site at any point in time. Steps 23-24 may occur simultaneously in an exemplary embodiment, with market related information (step 23) being returned to the end user 1 constantly throughout time, and complex orders (step 24) being executed at the co-located server 48 site at any point in time when market conditions are ideal (in accordance with applicable child algorithms 45). Specifically, step 24 takes fractions of a second to perform in this embodiment due to the use of high-bandwidth processing of complex orders at the co-located server site. The utilization of the virtual machine 49 at these co-located server sites 48 is key in allowing such high-bandwidth processing to take place at the servers 48, as a separate virtual machine 49 may be used for each end user 1 to process their own specific complex order(s) 46. In cases where multiple end users are sending multiple complex orders to the co-located server, the smart operating system 47 will regulate and load balance these complex orders (before and during execution) as outlined in step 25 and described previously.

Figure 5:
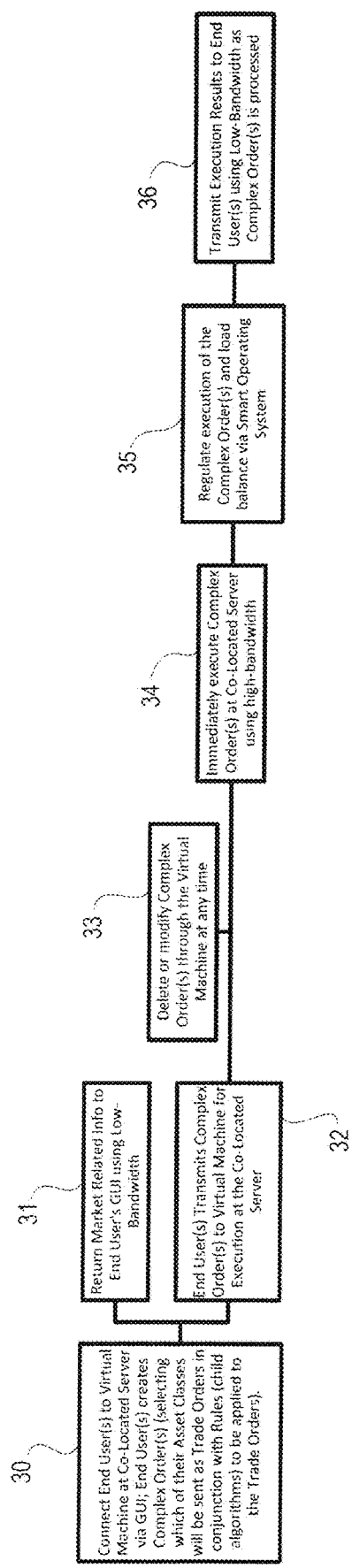
FIG. 5 is a flowchart of an exemplary embodiment of the present invention where a complex order is deployed to a co-located server for immediate execution based upon an end user's observance of transmitted market related information.

In another exemplary embodiment, these complex orders 46 may be sent to a co-located server 48 for immediate execution without the fear of latency severely impacting the desired outcome of the trading transaction, shown as steps 30-36 in FIG. 5. Here, the end user(s) 1 once again creates the complex order(s) 46 to be sent to the co-located server 48 in step 30. Market related information may be returned to the end user(s) 1 in step 31, and the end user(s) 1 may transmit their complex order(s) 46 to the co-located server 48 in step 32. In this exemplary embodiment, steps 31 and 32 may occur simultaneously (e.g. the end user(s) 1 sees appealing market related information returned to his/her GUI 40, and transmits the complex order(s) 46 for execution as an immediate reaction to observing such data). As an optional step 33, the end user(s) 1 is capable of modifying or deleting this complex order(s) 46 from the co-located server site at any point in time. The smart operating system 47 (or the end users themselves) constantly studies the market conditions relayed to the end user(s) 1 pertaining to the local market/exchange 10 of that co-located server 48 throughout time. When market conditions are deemed ideal, the end user(s) 1 (with possible assistance from the smart operating system 47) will transmit the complex order to the virtual machine 49 at the co-located server 48 (step 34), in which the virtual machine 49 then immediately executes the complex order 46 on site at the co-located server 48 using high-bandwidths to achieve order processing results substantially similar to what the current market related information just presented. Steps 31-32 and 34 thus occur within fractions of a second. The deployed virtual machines 45 located at the co-located servers 48 are crucial in allowing for such immediate transmittal and execution of the complex orders 46 using this exemplary embodiment. In cases where multiple end users are sending multiple complex orders to the co-located server, the smart operating system 47 will regulate and load balance these complex orders (before and during execution) as outlined in step 35 and described previously.

Figure 4:
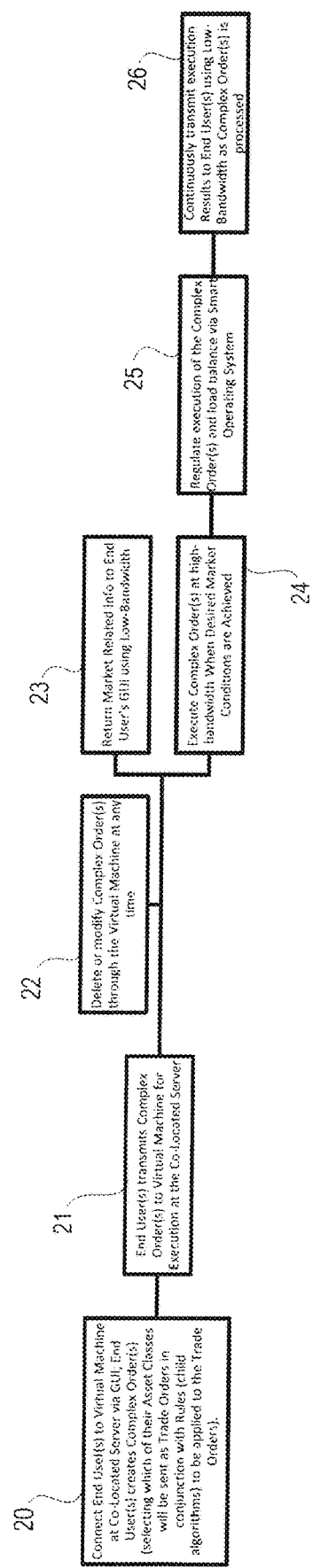
FIG. 4 is a flowchart of an exemplary embodiment of the present invention where a complex order is pre-deployed to a co-located server for later execution upon fulfillment of desired market conditions.

Once the complex orders 46 have been successfully executed at their respective co-located servers' 48 virtual machines 49, the resulting data from these executed complex orders are returned to the end users' 1 personal GUI 40, shown as step 26 in FIG. 4 and step 36 in FIG. 5. This transmitted return data simply verifies the results of the complex order as it is processing (e.g. sell results, buy results, etc.). Immediate processing, transmission, and reception of this return data does not have to be prioritized, unlike the processing of complex orders where absolute timing of execution is a must. This return data may therefore be returned at low-bandwidths.

In the aforementioned hardware form of the co-located server network, such orders 43 and algorithms 44, 45 (collectively, complex orders 46) may be exchanged via portable hardware (not shown; e.g. flash drives, external HDD/SSDs, CDs, etc.). This approach would require end user information to be sent well in advance of anticipated trades, as the algorithms will execute automatically after they are uploaded to the desired server 48 via such portable hardware. As explained prior, an advantage of taking this approach is the utilization of the full processing power available via the hardware of the desired physical co-located server.

In the aforementioned software form (where co-located server 48 interactions are achieved through virtual machines 49 generated), such orders 46 and algorithms 44, 45 are exchanged electronically (preferably through VPN connections, though other network connection methods may be used). This approach allows for the more immediate transmittal and subsequent execution of complex orders 46 at desired co-located servers 48, and provides more flexibility for processing of said transmitted end user 1 complex orders due to the dynamic nature of the virtual machines 49 being used. Furthermore, this software form allows for the easy modification and update of these complex orders 46 at co-located servers across the globe, all which is achievable through the end user's personal GUI 40. Encryption capabilities of end user data is drastically improved as a result of employing this software form, which makes use of the public and private execution logic containers 6a, 6b as described previously.

The system of the present invention may have a scalable local execution environment. The system may have one or more of the following application capabilities:

Subscribe to real-time low latency market data (push);
Query real time low latency market data (pull);
Query historical market data (pull);
Submit orders to the local market (co-located server) and manage them (cancel, cancel replace, etc.);
Inject into the real-time stream derived data;
Execute custom code downloaded by the end user;
Execute standard logic provided to the end user by the central hub.

The system may also have one or more of the following integration capabilities:

Receive orders via FIX;
Receive orders via REST APIs or other protocols (e.g. SOAP, RPC);
Receive logic via REST APIs or other protocols (e.g. SOAP, RPC);
Allow end users to query state via REST APIs or other protocols.

The system may also have one or more of the following system characteristics:

Logically isolated from any other end user;
Logically isolated from effects by any other application;
Up-time SLA of 99% during trading hours; intrinsically safe fail mode (e.g., close all orders on disconnect, etc.);

Survive single geographical location infrastructure failures;

Secure and only allow access by properly authenticated users and systems;

Implement and meet any local compliance regulations;

Secure web based administration portal;

Real-time monitoring and alerting system for both system and trading domains.

An embodiment of the system and method for a global trading exchange of the present invention may take the form of a hardware embodiment that uses software (including firmware, resident software, micro-code, etc.). Furthermore, an embodiment may take the form of a computer program product on a tangible computer-usable storage medium having computer-usable program code embodied in the medium. A memory device or memory portion of the system may form the medium. Computer program code or firmware to carry out an embodiment of the present disclosure could also reside on optical or magnetic storage media, especially while being transported or stored prior to or incident to the loading of the computer program code or firmware into the system. This computer program code or firmware may be loaded, as an example, by connecting a computer system to the programming interface.

It should be appreciated and understood that the present invention may be embodied as systems, methods, apparatus, computer readable media, non-transitory computer readable media and/or computer program products. The present invention may take the form of an entirely hardware embodiment, an entirely software embodiment (including firmware, resident software, micro-code, etc.) or an embodiment combining software and hardware aspects that may all generally be referred to herein as a "circuit," "module," "system," or "processor" configured to practice the method(s) or system(s) of the invention. The present invention may take the form of a computer program product embodied in one or more computer readable medium(s) having computer readable program code embodied thereon.

One or more computer readable medium(s) may be utilized, alone or in combination. The computer readable medium may be a computer readable storage medium or a computer readable signal medium. A suitable computer readable storage medium may be, for example, but not limited to, an electronic, magnetic, optical, electromagnetic, infrared, or semiconductor system, apparatus, or device, or any suitable combination of the foregoing. Other examples of suitable computer readable storage medium would include, without limitation, the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. A suitable computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Scala, Ruby, Python, Smalltalk, C++ or the like and conventional procedural programming languages, such as the "C" programming language or similar programming languages. The program code may execute entirely on the user's computing device (such as, a computer), partly on the user's computing device, as a stand-alone software package, partly on the user's computer device and party on a remote computing device or entirely on the remote computing device or server. In the latter scenario, the remote computing device may be connected to the user's computing device through any type of network, including a local area network (LAN), a wide area network (WAN), or a wireless local area network (WLAN), or the connection may be made to an external computing device (for example, through the Internet using an Internet Service Provider).

The methods of operation of the present invention may be implemented by computer program instructions. These computer program instructions may be provided to a processor of a general purpose computing device (such as, a computer), special purpose computing device, or other programmable data processor or processing apparatus to produce a machine, such that the instructions, which execute via the processor of the computing device or other programmable data processing apparatus, create means for implementing the functions/acts specified in the flowchart and/or block diagram block or blocks.

These computer program instructions may also be stored in a computer readable medium that can direct a computing device, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computing device, other programmable data processing apparatus, or other devices to cause a series of operational steps to be performed on the computing device, other programmable apparatus or other devices to produce a computer implemented process such that the instructions which execute on the computing device or other programmable apparatus provide processes for implementing the functions/acts specified in a flowchart and/or block diagram block or blocks.

Thus, the present invention provides one or more of the following advantages: 1) a way to execute global trade orders to mitigate the effect of transit time latency; 2) permits customers to download algorithms together with trade orders from remote locations to co-located production servers to execute orders, and the algorithm can erase itself when done; 3) provides for fills and market activity to be sent back to the customer from the co-located server; 4) permits one to also download execution algorithms to a co-located server library to be used at any time with a security key; and 5) allows for personal end user modification of complex orders. The methodology of the system and method of the present invention may be applied to any asset class.

While the present invention has been particularly described, in conjunction with one or more specific embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method of mitigating the effects of transit time latency in the execution of global trade orders at remote exchange servers, comprising:
    providing a graphical user interface for an order management system/execution management system for permitting remote access by an end user to at least one exchange server, the graphical user interface providing centralized global control to the end user;
    providing at least one co-located server for receiving remote transmissions from the end user via the order management system/execution management system and communicating with the at least one exchange server, the at least one co-located server being in close proximity with the at least one exchange server and sharing a same protocol with the exchange server;
    providing a smart operating system for transmission to the at least one co-located server with the remote transmission;
    determining at least one polymorphic rule for execution of a trade order;
    choosing the at least one polymorphic rule by the end user via the graphical user interface based upon desired trade protocols of the end user for particular asset classes of the end user;
    creating a complex order in the form of a logical software object comprising basic parameters for the trade order and the at least one polymorphic rule for executing the trade order, via the graphical user interface;
    encrypting the complex order via a private container;
    deploying a virtual machine to a selected one of the at least one co-located servers, the virtual machine enabling the end user to interact with the selected co-located server via the graphical user interface;
    mirroring the order management system/execution management system at the selected co-located server via the virtual machine;
    translating the complex order at the selected co-located server via the virtual machine to the exchange server protocol via an execution logic API;
    parameterizing the complex order at the selected co-located server in accordance with the at least one polymorphic rule based on a real-time market data feed from the exchange server to create the trade order;
    executing the trade order at the exchange server using the real-time market data feed to mitigate latency characteristics that would otherwise occur under a standard execution procedure;
    overseeing execution of the trade order via the smart operating system to maintain a real-time slate, and optionally interceding via the smart operating system throughout execution of the trade order; and
    mitigating the effects of transit time latency by executing the trade order at the exchange server using the virtual machine at the selected co-located server, due to the selected co-located server being in close proximity with the exchange server and the complex order being translated and parameterized at the selected co-located server using the real-time market data feed prior to execution of the trade order at the exchange server.

2. The method of claim 1 further comprising:
    overseeing the execution of a plurality of trade orders by the smart operating system at the selected co-located server.

3. The method of claim 2, wherein the step of overseeing the execution of a plurality of trade orders further comprises:
    load balancing multiple complex orders across multiple end users via the smart operating system within the selected co-located server.

4. The method of claim 1 further including:
    deleting the complex order at the virtual machine prior to or after completion of execution of the trade order.

5. The method of claim 1 further including:
    modifying the complex order at the virtual machine at any point in time prior to or during the execution of the trade order.

6. The method of claim 1 further including:
    gathering result data created during the execution of the complex order at the exchange server;
    transmitting the result data from the selected co-located server back to the end user as the result data is gathered; and
    displaying the result data to the end user via the graphical user interface.

7. The method of claim 1 wherein the end user determines the at least one polymorphic rule for execution of the trade order from a third party repository.

8. The method of claim 1 wherein the end user determines the at least one polymorphic rule for execution of the trade order to be modified by the end user.

9. A system of mitigating the effects of transit time latency in the execution of global trade orders at remote exchange servers, comprising:
    a graphical user interface for an order management system/execution management system for permitting remote access by an end user to at least one remote exchange server, the graphical user interface providing centralized global control to the end user;
    at least one co-located server for receiving remote transmissions from the end user, for the execution of at least one complex order to a selected one of the at least one remote exchange servers, and for the transmittal of market activity and return data, the at least one co-located server being in close proximity with the selected remote exchange server and sharing a same protocol with the remote exchange server, the at least one co-located server including an execution logic API for translating the at least one complex order to the selected remote exchange server protocol and for parameterizing the at least one complex order at the co-located server in accordance with a polymorphic rule for execution of a trade order based on a real-time market data feed from the selected remote exchange server to create the trade order;
    the polymorphic rule for execution of the trade order, the polymorphic rule chosen by the end user based upon desired trade protocols of the end user for a particular asset class of the end user;
    the at least one complex order in the form of a logical software object comprising a combination of basic parameters for the trade order and the polymorphic rule, the at least one complex order being encrypted via a private container;

a virtual machine deployed to a selected one of the at least one co-located servers, the virtual machine mirroring the order management system/execution management system at the selected co-located server and enabling the end user to interact with the selected co-located server via the graphical user interface; and a smart operating system for overseeing the execution of the trade order and for optionally interceding during execution;

wherein the selected co-located server is enabled via the virtual machine to process the at least one complex order using the real-time market data feed from the exchange server to mitigate the negative effects of transit time latency that would otherwise occur under a standard execution procedure due to the complex order being translated and parameterized at the selected co-located server via the virtual machine prior to transmission of the trade order to the selected exchange server.

10. The system of claim 9 wherein the smart operating system oversees the execution of multiple complex orders within the selected co-located server.

11. The system of claim 9 further including load balancing multiple complex orders across multiple end users via the smart operating system within the selected co-located server.

12. The system of claim 9 wherein the end user can delete the complex order at the selected co-located server prior to or after execution of the trade order.

13. The system of claim 9 wherein the end user can modify the complex order at the selected co-located server at any time prior to or during execution of the trade order.

* * * * *